3,155,629
SYNTHESIS OF POLYMERS FROM LIQUID NITRILES BY ELECTRICAL DISCHARGE

Marvin C. Tobin, Westport, Conn., and William G. Deichert, Flushing, N.Y., assignors to American Cyanamid Company, New York, N.Y., a corporation of Maine
No Drawing. Filed May 19, 1961, Ser. No. 111,167
6 Claims. (Cl. 260—2)

The present invention relates to novel homopolymers and to their preparation. More particularly, it relates to nitrile polymers prepared by polymerizing liquid, ordinarily non-polymerizable materials containing a nitrile group. Still more particularly, it is concerned with the polymerization of ordinarily non-polymerizable, liquid organic nitriles induced by electric discharge techniques.

In the past, organic compounds containing an ethylenically substituted grouping have been successfully polymerized by chemical and physical means. Thus, for instance, acrylonitrile or styrene has been polymerized either by emulsion polymerization employing well-known redox systems or by ionizing radiation. Nonetheless, the application of such techniques to ordinarily non-polymerizable compounds which lack the grouping: $CH_2=C<$ has been singularly unsuccessful. Polymerization of a nitrile, such as acetonitrile or benzonitrile, cannot be achieved by presently known chemical means. Subjecting the latter to physical techniques as by ionizing radiation utilizing a Van de Graaff generator, nitrile polymerization is negative. The nitrile undergoes no change in color or viscosity or other observable physical state. To develop a method for polymerizing ordinarily non-polymerizable nitrile materials would be highly advantageous commercially, since a new class of relatively inexpensive polymeric compounds would be made available.

It is, therefore, a principal object of the present invention to prepare novel polymeric compounds from ordinarily non-polymerizable nitriles. It is a further object of the invention to prepare polymers in good yield and purity from ordinarily non-polymerizable nitriles by employing certain physical means. Other objects and advantages will become apparent to those skilled in the art from a consideration of the following detailed description.

To this end, liquid aliphatic or aryl nitriles which do not contain ethylenically substituted groups can be polymerized unexpectedly by means of electric discharge techniques. The liquid nitriles are converted to colored particles which do not possess any well-defined melting point but soften over a wide range of temperatures.

According to the process of the invention, polymers from ordinarily non-polymerizable, liquid nitriles are surprisingly formed by subjecting these nitriles to the action of an electric field created by an electric discharge involving a relatively low order of energy input. Advantageously, the polymerization process is carried out at room temperature or below. Hence, large capital expenditures for equipment necessary either for heating a reaction mass or for imparting the required energy to induce chemical changes therein, become wholly unnecessary.

Illustrative of the liquid organic nitriles which do not contain ethylenically substituted groups but are capable of being polymerized in accordance with the process of the invention are represented by the general formula:

R—CN where R is a lower saturated aliphatic or carbocyclic aryl radical which may be substituted or unsubstituted. Substituents include, for instance, lower alkyl, halogen, such as fluoro, chloro, bromo or iodo, amino carboxy and alkoxy. As specific nitrile compounds may be mentioned: acetonitrile, butyro-nitrile, valeronitrile, caprylonitrile, chloroacetonitrile, ethylcyanoacetate, benzonitrile, o-tolunitrile, naphthonitrile, cyanoacetic acid and N-cyanoaniline.

As hereinabove mentioned, the nitriles are subjected to an electric field. The latter field is created by providing for voltages between about 1000 and 40,000 at frequencies of about 20–100 cycles per second. Voltages in the range of between about 10,000 and about 20,000 at frequencies between about 50 and 75 cycles are preferred. The nitriles can be directly treated, since these compounds are polar in nature. However, it has been observed that subjecting a nitrile to the direct action of such voltages creates a violent, uncontrollable reaction. Hence, it is a preferred practice to subject the nitrile to an electric discharge while maintaining a physical separation of the nitrile from electrodes employed in creating such electric discharge. This is accomplished by utilizing any conventional non-conductor separator, such as glass. In this manner, the reaction is less violent and more easily controllable than by applying an electric discharge directly to the nitrile to be converted. To insure more complete control of reaction, the temperature of the reaction mass can advantageously be reduced from about 20° C. to from between about 0° C. and 10° C.

Any suitable apparatus for providing the required voltage may be employed. Exemplary of the latter may be mentioned a high voltage step-up A.C. transformer. In general, the voltages can be varied by means of a conventional variac connected to the primary of the transformer. This is highly desirable, since the reaction may be unduly violent when subjected to an applied high initial voltage, say in the range of 20,000 volts. These voltages are, therefore, gradually applied starting at about 7500 volts. Over a period of several hours the voltages are increased to about 20,000 volts in predetermined increments. Usually, about thirty hours or less are required to form sufficient solids to complete the polymerization process. The polymerization reactor may be widely varied in design. As stated previously, it is preferable to maintain a separation between the electrodes used in creating the electric discharge. One such reactor comprises three concentric glass tubes closed at one end. The outer tube contains a first electrode immersed in an electrolyte, such as for instance a five (5) to ten (10) percent aqueous sodium chloride or potassium chloride solution and equivalents thereof. The second tube contiguous with the first houses the nitrile to be treated. The innermost tube contains a second electrode immersed in the same electrolyte supplied to the outer tube. Electrodes are connected to the aforementioned high voltage transformer which in turn is connected to a variac. The latter is connected to an A.C. power source. Of course, any equivalent apparatus adapted to provide the requisite voltages are within the purview of this disclosure.

The practice of the present invention is further illustrated by the following examples which are to be taken as illustrative only.

Example 1

A Pyrex tube reactor, approximately twenty centimeters in overall length and two centimeters in thickness, comprising three concentric tube sections is half filled with a dilute salt solution in the outer and inner sections and chloroacetonitrile in the central section. Into each electrolyte is placed a copper electrode shielded from the other. The electrodes are then directly connected to a 20,000 volt 60 cycle transformer whose voltage is regulated by a variac transformer which is connected to 110 volt A.C. power source.

The reactor and contents are next placed in a water bath and a voltage of about 7,500 v. is applied by means of the variac. Reaction is smooth. Excessive bubbling is not observed. It is held for about one hour during which time interval the clear chloroacetonitrile solution begins to darken to a brownish amber color and concomitant particles are seen to form on the glass surface. In the next hour, the voltage is increased to 8,500 volts and then gradually increased to 20,000 volts over a thirty hour period. Approximately 60 percent of the nitrile liquid is converted to a solid polymeric blackish material. The latter is removed from the reactor by dissolving the polymer in acetone. To the resultant solution is next added ether. The homopolymer of chloroacetonitrile precipitates out of solution. Upon filtration, the polymer is recovered in good yield and purity.

Particles of polymer are next examined microscopically. At room temperature the particles are opaque and blackish. Transmitting light through the particles, they appear to be a deep red. The particles are heated to 350° C. At the latter temperature, they cross-link to the extent that the thermal treated particles are rendered insoluble in acetone.

Five parts of homopolymer, prepared in accordance with this example, are dissolved in ninety-five parts of acetone. Resultant solution is next employed to coat ordinary wrapping paper by a direct spray application. On drying of the so-sprayed paper, the latter is rendered substantially water-proofed.

*Example 2*

Example 1 is repeated in every material detail except that the temperature of the reaction medium is not cooled to about 0° C. The reaction is more violent when the voltage is initially applied and as the polymerization progresses, the reaction becomes quiescent. Approximately 45 percent of the liquid nitrile is converted to the solid polymer.

*Example 3*

Following the procedure of Example 1 in every detail except that acetonitrile is substituted for chloroacetonitrile. Opaque particles interspersed with deep reddish amber coloration are obtained in about 40 percent yield. The homopolymer of acetonitrile in form of thin particles is then heated to 170° C. at which temperature its color darkened. Upon additional heating to 350° C., the particles become opaque again and are rendered insoluble in acetone.

*Example 4*

To show the effect of ionizing radiation on acetonitrile, the following example is presented.

A sealed glass tube half filled with acetonitrile is exposed to a beam of 100 k.v. X-rays from a maxitron for a total dose of 500,000 rads. No visible change occurs. Radiation is continued for an additional fifty minutes. Acetonitrile does not appear to be chemically altered; nor does it undergo any color change and no solid matter is formed. Polymerization, therefore, does not take place utilizing ionization radiation.

*Example 5*

The procedure of Example 1 is repeated in every material detail except that benzonitrile is substituted for chloroacetonitrile. Brown amber particles of homopolymerized benzonitrile are recovered in the yield of about 50 percent. When heated to 280° C., some shrinkage of the particles occurs as well as intensification of color. Further increase in temperature to 350° C. results in opaque particles which are insoluble in acetone.

*Example 6*

Propionitrile is substituted for chloroacetonitrile in the process of Example 1. Homopolymer of propionitrile is obtained as amber to brown particles in about 55 percent yield. When heated to 160° C., the homopolymer darkened and at 350° C. the particles become opaque and acetone insoluble.

*Example 7*

The procedure of Example 1 is repeated in every detail except that o-tolunitrile is substituted for chloroacetonitrile. Homopolymer of the o-tolunitrile is obtained in 53 percent yield as brown brittle particles. When the latter are heated to about 210° C., the homopolymer softens and begins to flow. Increasing the temperature to 320° C., the latter begins to harden or thermoset. At 350° C., the product is thermoset and completely insoluble in acetone.

*Example 8*

Following the procedure of Example 1 in every detail except that ethyl cyanoacetate is substituted for chloroacetonitrile. A homopolymer of ethyl cyanoacetate is obtained in 25 percent yield which forms a yellow water-impervious film from acetone rendering textile fibers substantially water-proof. The homopolymer softens at 125° C. and becomes fluid at about 200° C. Loss of fluidity is noted at about 240° C. and at 290° C. the homopolymer becomes hardened and blackish brown in color. The latter thermally-treated homopolymer is acetone insoluble.

We claim:

1. A solid, linear homopolymer of a liquid, polymerizable nitrile monomer selected from the group consisting of a lower alkyl nitrile, benzonitrile, tolunitrile, ethyl cyanoacetate and chloroacetonitrile, said homopolymer being prepared by subjecting said polymerizable nitrile monomer to a field induced by an electrical discharge created by providing a voltage across said field of between about 1000 volts and about 40,000 volts at 60 cycles, and thereafter recovering said solidified nitrile homopolymer.

2. A solid, linear homopolymer of acetonitrile, prepared by subjecting acetonitrile monomer to a field induced by an electrical discharge created by providing a voltage across said field of between about 1000 volts and about 40,000 volts at 60 cycles and thereafter recovering said solidified acetonitrile homopolymer.

3. A solid, linear homopolymer of benzonitrile, prepared by subjecting benzonitrile monomer to a field induced by an electrical discharge created by providing a voltage across said field of between about 1000 volts and about 40,000 volts at 60 cycles and thereafter recovering said solidified benzonitrile homopolymer.

4. A solid, linear homopolymer of ethyl cyanoacetate prepared by subjecting ethyl cyanoacetate monomer to a field induced by an electrical discharge created by providing a voltage across said field of between about 1000 volts and about 40,000 volts at 60 cycles and thereafter recovering said solidified ethyl cyanoacetate homopolymer.

5. A solid, linear homopolymer of chloroacetonitrile, prepared by subjecting chloroacetonitrile monomer to a field induced by an electrical discharge created by providing a voltage across said field of between about 1000 volts and about 40,000 volts at 60 cycles, and thereafter recovering said solidified chloroacetonitrile homopolymer.

6. A solid, linear homopolymer of tolunitrile, prepared by subjecting tolunitrile monomer to a field induced by an electrical discharge created by providing a voltage across said field of between about 1000 volts and about 40,000 volts at 60 cycles, and thereafter recovering said solidified tolunitrile homopolymer.

References Cited in the file of this patent

UNITED STATES PATENTS

| 1,473,347 | Hoskins | Nov. 6, 1923 |
| 2,125,851 | Ralston | Aug. 2, 1938 |
| 2,175,092 | Ralston | Oct. 3, 1939 |

OTHER REFERENCES

Cairns et al.: Journal American Chemical Society, vol. 74, pages 5633–6 (1952).

Deichert et al.: Journal of Polymer Science, vol. 54 (1961), S39–41, QD 291, P6J6.